US009954654B2

(12) United States Patent
Bucknell et al.

(10) Patent No.: US 9,954,654 B2
(45) Date of Patent: *Apr. 24, 2018

(54) METHOD FOR COMMUNICATING A NETWORK, A SECONDARY STATION AND A SYSTEM THEREFOR

(71) Applicant: KONINKLIJKE PHILIPS N.V., Eindhoven (NL)

(72) Inventors: Paul Bucknell, Brighton (GB); Bernard Hunt, Redhill (GB); Matthew Peter John Baker, Canterbury (GB); Timothy James Moulsley, Cat (GB)

(73) Assignee: Koninklijke Philips N.V., Eindhoven (NL)

(*) Notice: Subject to any disclaimer, the term of this patent is extended or adjusted under 35 U.S.C. 154(b) by 108 days.

This patent is subject to a terminal disclaimer.

(21) Appl. No.: 14/948,897

(22) Filed: Nov. 23, 2015

(65) Prior Publication Data
US 2016/0080116 A1 Mar. 17, 2016

Related U.S. Application Data

(63) Continuation of application No. 13/058,092, filed as application No. PCT/IB2009/053470 on Aug. 7, 2009, now Pat. No. 9,198,263.

(30) Foreign Application Priority Data

Aug. 11, 2008 (EP) ..................... 08300255

(51) Int. Cl.
H04W 4/00 (2009.01)
H04L 1/18 (2006.01)
H04W 72/12 (2009.01)
H05B 37/02 (2006.01)
H04W 28/02 (2009.01)
H04W 72/04 (2009.01)
H04W 84/04 (2009.01)

(52) U.S. Cl.
CPC ............ *H04L 1/1874* (2013.01); *H04L 1/188* (2013.01); *H04L 1/189* (2013.01); *H04L 1/1896* (2013.01); *H04W 28/0278* (2013.01); *H04W 72/0453* (2013.01); *H04W 72/1284* (2013.01); *H05B 37/0272* (2013.01); *H04W 84/045* (2013.01); *Y02B 20/445* (2013.01)

(58) Field of Classification Search
CPC ........... H04W 52/365; H04W 72/1268; H04W 72/04; H04W 36/18; H04W 36/24
See application file for complete search history.

(56) References Cited

U.S. PATENT DOCUMENTS 7,733,832 B2 * 6/2010 Kwak ............... H04W 72/1284 370/230
7,881,236 B2 2/2011 Park et al.
8,243,660 B2 8/2012 Jeong et al.
8,681,806 B2 3/2014 Bucknell et al.
2003/0120802 A1 6/2003 Kohno
2006/0034240 A1 2/2006 Kwak et al.
2008/0004058 A1 1/2008 Jeong et al.
2008/0045255 A1 2/2008 Revel et al.
2008/0304447 A1 * 12/2008 Kim ...................... H04L 1/1877 370/329
2009/0299140 A1 12/2009 Wang
2010/0091725 A1 * 4/2010 Ishii ...................... H04W 72/04 370/329
2010/0150085 A1 * 6/2010 Ishii ...................... H04W 72/04 370/329
2010/0265896 A1 10/2010 Park et al.
2011/0039500 A1 2/2011 Moulsley et al.
2011/0085566 A1 4/2011 Bucknell et al.
2011/0128859 A1 6/2011 Bucknell et al.
2012/0106389 A1 5/2012 Baker et al.
2015/0237601 A1 8/2015 Kim et al.

FOREIGN PATENT DOCUMENTS

JP 2011522585 A 8/2011
WO 2007148881 A2 12/2007
WO 2008060077 A1 5/2008

OTHER PUBLICATIONS

Motorola et al, "Update to the Reception of Systeminformationblocktype8", 3GPP TSG RAN WG2 Meeting #62BIS, R2-083749, Warsaw, Poland, Jun. 30-Jul. 4, 2008, 3 Pages.
Samsung, "Reliability of BSR", 3GPP TSG-RAN2 Meeting #62BIS, R2-083498, Warsaw, Poland, Jun. 30-Jul. 4, 2008, p. 1-5.
Qulacomm Europe, "BSR Triggers", 3GPP TSG-RAN WG2 #60, R2-075165, Jeju, Korea, Nov. 5-9, 2007, 2 Pages.
Ericsson, "Error Cases of Buffer Status Reporting", 3GPP TSG-RAN WG2 #60BIS, R2-080086, Sevilla, Jan. 14-18, 2008, 3 Pages.
Philips, NXP Semiconductors: Improving the Robustness of Buffer Status Reporting, Aug. 11, 2008, XP002551800.
Ericsson, "Robustness of Buffer Status Reporting", June 24, 2008, XP002551799.
GPP, "Evolved Universal Terrestrial Radio Access (E-Ultra) Medium Access Control (MAC) Protocol Specification", Jun. 4, 2008, XP002551801.

* cited by examiner

*Primary Examiner* — Jay P Patel

(57) ABSTRACT

The present invention relates to a method for communicating in a network comprising at least one primary station communicating with at least one secondary station, comprising (a) the secondary station sending to the primary station a buffer status report representative of the amount of data in a buffer of the secondary station,
(b) in absence of acknowledgement from the primary station, the secondary station retransmitting the buffer status report and,
(c) if a maximum number of retransmissions has been reached, the secondary station sending a further buffer status report to the primary station.

27 Claims, 2 Drawing Sheets

METHOD FOR COMMUNICATING A NETWORK, A SECONDARY STATION AND A SYSTEM THEREFOR

CLAIM OF PRIORITY

The present application is a continuation of U.S. patent application Ser. No. 13/058,092, filed on Feb. 8, 2011, (to be issued as U.S. Pat. No. 9,198,263 on Nov. 24, 2015) which was the National Stage of International Application No. PCT/IB2009/053470 filed on Aug. 7, 2009, which claims priority of EP application EP08300255 filed Aug. 11, 2008, each of which are incorporated by reference herein in their entirety.

FIELD OF THE INVENTION

The present invention relates to a method for communicating in a network comprising a primary station and at least one secondary station, and to such a secondary station. More specifically, this invention relates to a method for communicating in a mobile telecommunication network, like a GSM (Global System for Mobile communications) or a UMTS (Universal Mobile Telecommunications System) network.

This invention is, for example, relevant for UMTS and UMTS Long Term Evolution, but as well to hubs which route calls from multiple terminals to base stations.

BACKGROUND OF THE INVENTION

In a mobile telecommunication network like a UMTS system, a primary station, for instance a Node B (or Base Station or eNB) communicates with at least one secondary station, for instance a User Equipment (or Mobile Station), by means of a plurality of channels. In order to transmit data to the primary station, a secondary station needs to request a resource to the primary station, which is then allocated. This request of allocation can be made by several ways depending on the considered channel.

In an example, in order to request a resource, it is required to indicate the amount of data to be transmitted, i.e. the data in the buffer of the secondary station. To this end, the secondary station transmits to the primary station a buffer status report indicative of the amount of data in the secondary station buffer. Thus, the primary station allocates a resource corresponding to both the capability of the network and the amount of data to be transmitted. This permits to adjust the allocation of resource.

However, in the current version of the specification, when a secondary station transmits this buffer status report, and receives no positive acknowledgement, it performs retransmission till reception of a positive acknowledgement or till the number of retransmissions reaches a maximum number. In the latter case, the secondary station has not been heard by the primary station and will not receive a resource grant for a long period. This leads to a significant delay, the secondary station no longer having any means to indicate its buffer status to the primary station.

SUMMARY OF THE INVENTION

It is an object of the invention to propose a method enabling to alleviate this above problem.

It is another object of the invention to propose a secondary station which is able to keep the contact with the primary station.

To this end, in accordance with a first aspect of the invention, a method is proposed for communicating in a network comprising at least one primary station communicating with at least one secondary station, comprising
(a) the secondary station sending to the primary station a buffer status report representative of the amount of data in a buffer of the secondary station,
(b) in absence of acknowledgement from the primary station, the secondary station retransmitting the buffer status report and,
(c) if a maximum number of retransmissions has been reached, the secondary station sending a further buffer status report to the primary station.

In accordance with a second aspect of the invention, a secondary station is proposed comprising means for communicating in a network comprising at least one primary station communicating with the secondary station, the secondary station comprising transmission means for transmitting to the primary station a buffer status report representative of the amount of data in a buffer of the secondary station, retransmission means for, in absence of acknowledgement from the primary station, retransmitting the buffer status report and, wherein the transmission means are arranged for, if a maximum number of retransmissions has been reached, sending a further buffer status report to the primary station.

In accordance with a third aspect of the invention, a system of communication is proposed comprising at least one primary station communicating with at least one secondary station, the secondary station comprising transmission means for transmitting to the primary station a buffer status report representative of the amount of data in a buffer of the secondary station, retransmission means for, in absence of acknowledgement from the primary station, retransmitting the buffer status report and, wherein the transmission means are arranged for, if a maximum number of retransmissions has been reached, sending a further buffer status report to the primary station.

As a consequence, if a secondary station arrives in the state where it has reached for instance the maximum number of retransmissions, it can again request a resource by sending another buffer status report. This second buffer status report may be of the same kind as the first status report, and even identical to the first report.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
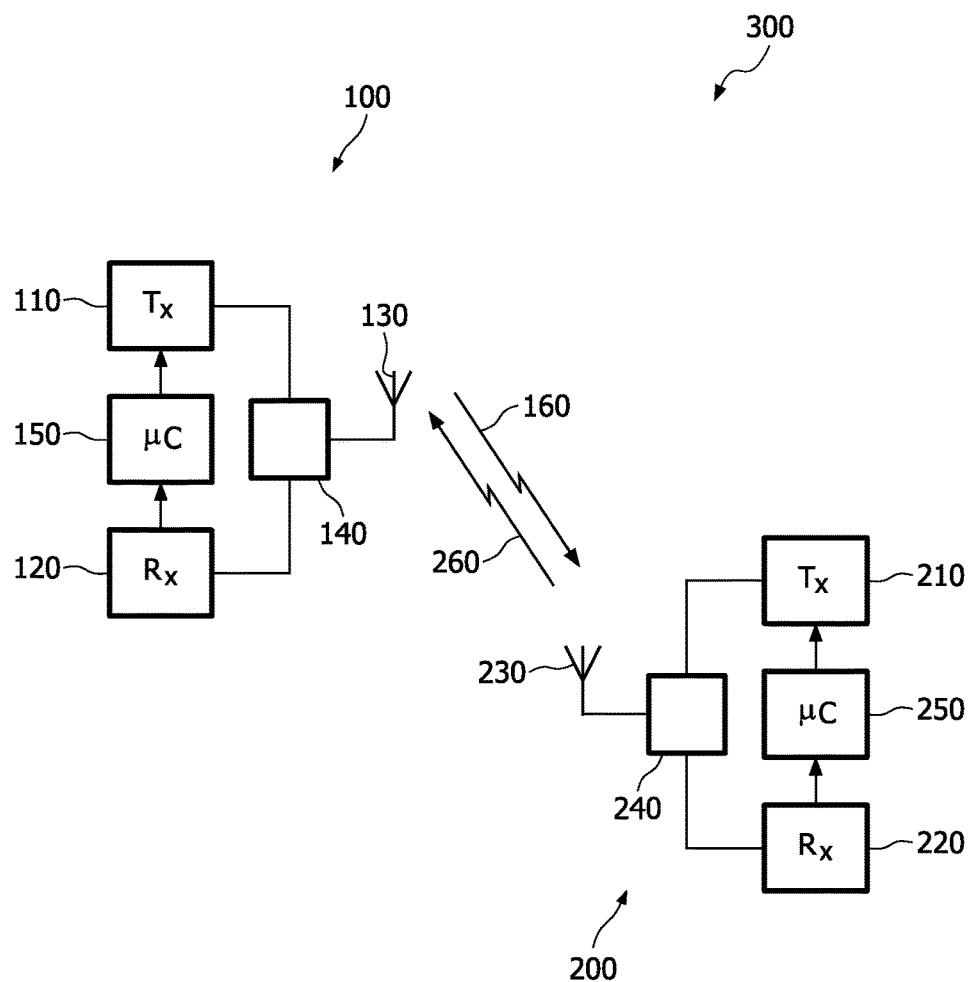
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

From time to time, the secondary station 200 transmits on the uplink channel 260 an indication of the status of its buffer containing data to be transmitted. This Buffer Status Report can be of different types. A short Buffer Status Report (BSR) comprises the identity of a single group of logical channels, together with a 6-bit indicator of the amount of data corresponding to that group of logical channels currently residing in the secondary station's buffer awaiting transmission. A long BSR comprises 4 concatenated short BSRs, each corresponding to a different group of logical channels.

Many communication systems operate using a centralised scheduler which is responsible for allocating transmission resources to different nodes. A typical example is the uplink of the UMTS LTE, where the uplink transmissions from different secondary stations (or UEs) are scheduled in time and frequency by the primary station (or eNB); the eNB transmits a "scheduling grant" message to a UE, indicating a particular time-frequency resource for the UE's transmission typically around 3 ms after the transmission of the grant message. The grant message also typically specifies the data rate and/or power to be used for the UE's transmission.

In order for the eNB to issue appropriate grants, it needs to have sufficient information about the amount, type of data and the urgency of it awaiting transmission in the buffer of each UE. This information can be used to inform the scheduler in the eNB of either the satisfaction level of individual UEs or UEs whose service might be close to being dropped.

In LTE, a number of different types of buffer status report (BSR) messages are therefore defined, which may be transmitted from a UE to the eNB when certain triggers occur. The state of the art in this respect is defined by the current version of 3GPP TS36.321 (as of June 2008) §5.4.5, incorporated by reference.

A short BSR comprises the identity of a single group of logical channels, together with a 6-bit indicator of the amount of data corresponding to that group of logical channels currently residing in the UE's buffer awaiting transmission. A long BSR comprises 4 concatenated short BSRs, each corresponding to a different group of logical channels.

This is currently defined in 36.321 (as of June 2008) §6.1.3.1 incorporated by reference.

As detailed in this specification, there are two main types of Buffer Status Reports (BSR) with different characteristics.

Regular BSR which is triggered only if Uplink data arrives in the UE transmission buffer and the data belongs to a logical channel with higher priority than those for which data already existed in the UE transmission buffer.

Periodic BSR which is triggered when the PERIODIC BSR TIMER expires.

If the UE has no Uplink resources allocated for new transmission for this TTI and if a Regular BSR has been triggered since the last transmission of a BSR a Scheduling Request (SR) shall be triggered.

A BSR being "triggered" is not necessarily the same as transmitting a BSR. For example, in the case above, the following sequence of steps can be identified:
a) Data of higher priority arrives in UE buffer
b) BSR is triggered
c) No UL resources are allocated for this TTI, so a SR is triggered
d) SR is transmitted
e) UL grant should then be received
f) Finally the BSR is actually transmitted.

The BSR mechanism has been designed so that only regular BSRs can trigger the sending of an SR if there are no UL resources available for the sending of the regular BSR. When a periodic BSR is triggered and there is no UL resource allocated then the UE cannot send SR, as it is assumed that the network knows that the UE has data available and is deliberately not allocating any UL resources for the UE to use.

If the triggering of a periodic BSR were allowed to trigger an SR in the case of no UL resource being available for the sending of the BSR then the system may become overloaded with UEs sending SR, particularly if the UE has no PUCCH resources available, when an SR would require the sending of a RACH access.

Also, an SR is considered pending and is repeated until UL-SCH resources are granted (i.e. for the sending of a BSR).

A problem with the BSR procedure defined above is that there is a possibility that the information that the network knows about the state of the buffers in the UE can be different to the actual state of the UE buffers. This can occur as detailed below:

BSRs are transported as MAC control elements that are subject to HARQ protocol. This means that an individual BSR may be delayed as the initial transmission may be not be received correctly by the eNB and one or more retransmissions may be required. If the Maximum number of transmissions of a regular BSR is reached without the BSR being successfully received by the eNB then there is no way for the UE to recover from this as there is no trigger defined for the UE to send an SR or repeat again the failed BSR.

Figure 2:
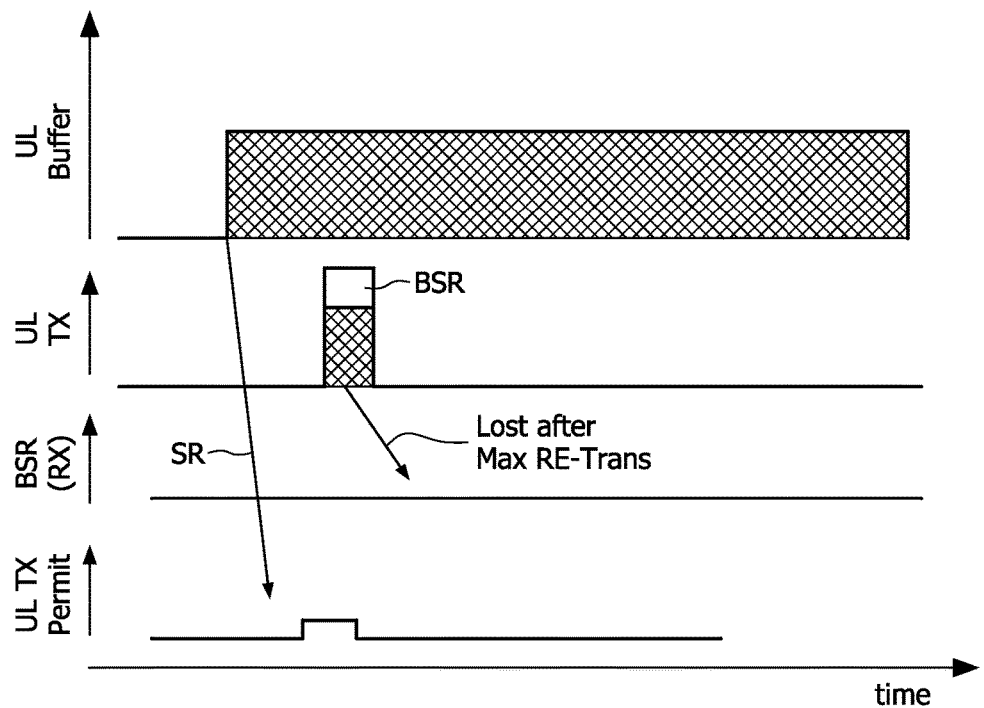
FIG. 2 is a time chart illustrating the exchange of messages in accordance with a conventional technique.

This is what is illustrated on FIG. 2, where the BSR sent by the secondary station is lost since it has reached the maximum number of retransmissions.

The problem is that if that first BSR is lost then there is no way to generate a subsequent SR to obtain uplink resources (because unless data of even higher priority arrives in the buffer, the data currently in the buffer does not trigger another regular BSR and hence an SR) and a deadlock situation would arise.

One possible solution involves configuring periodic BSRs. If a periodic BSR is configured and the initial BSR is lost then this "lost" BSR will be sent in the first configured UL resource for the periodic BSR. The disadvantage of this is that it requires periodic BSRs to be configured with a sufficiently short interval that the deadlock time is small, and this would increase the control signalling overhead as when data is present in the UL buffer, BSRs will be sent more often. Moreover, if the network does not allocate a grant for the configured periodic BSR, the periodic BSRs cannot be sent and the UE is also not allowed to generate an SR in such a case.

A solution could also be proposed allowing the periodic BSR to generate an SR but only for a configurable amount of time. Thus the following condition: if a Periodic BSR has been triggered since the last transmission of a BSR and the UE has data available for transmission, and the time since the transmission of the last BSR exceeds the BSR STALL AVOIDANCE timer then a Scheduling Request shall be triggered. This would solve the problem but only if periodic BSRs are configured.

In cases described above the secondary station uplink data buffer is out of synchronization with the network view of the buffer.

In accordance with a first aspect of the invention, a mechanism is proposed for a UE to send a buffer status report (BSR) when the transmission of a first buffer status report is not positively acknowledged by the network after a predetermined number of attempts.

This will be known by the secondary station for instance, as the maximum number of HARQ transmissions for the BSR has occurred without the MAC packet containing the BSR being positively acknowledged by the network.

According to one embodiment of the invention, if the secondary station receives a UL grant after the previous BSR has not been positively acknowledged, this UL grant is used to re-send the original BSR or an updated version of it.

According to a variant of this embodiment of the invention, if a previous BSR has not been positively acknowledged then a Scheduling request will be made to request UL resource in order to send the BSR and data. In some embodiments the sending of the SR is conditional on no UL grant being received within a certain time window after e.g. the last transmission of the previous not-positively acknowledged BSR, or the time at which ACK was expected but not received.

In other words, the invention could be described by stating that a regular BSR is also triggered if a previous regular BSR is not positively acknowledged. Because of the way the triggers for SR are defined, this would also have the effect of triggering an SR if there was no UL grant in which to send the triggered BSR.

Figure 3:
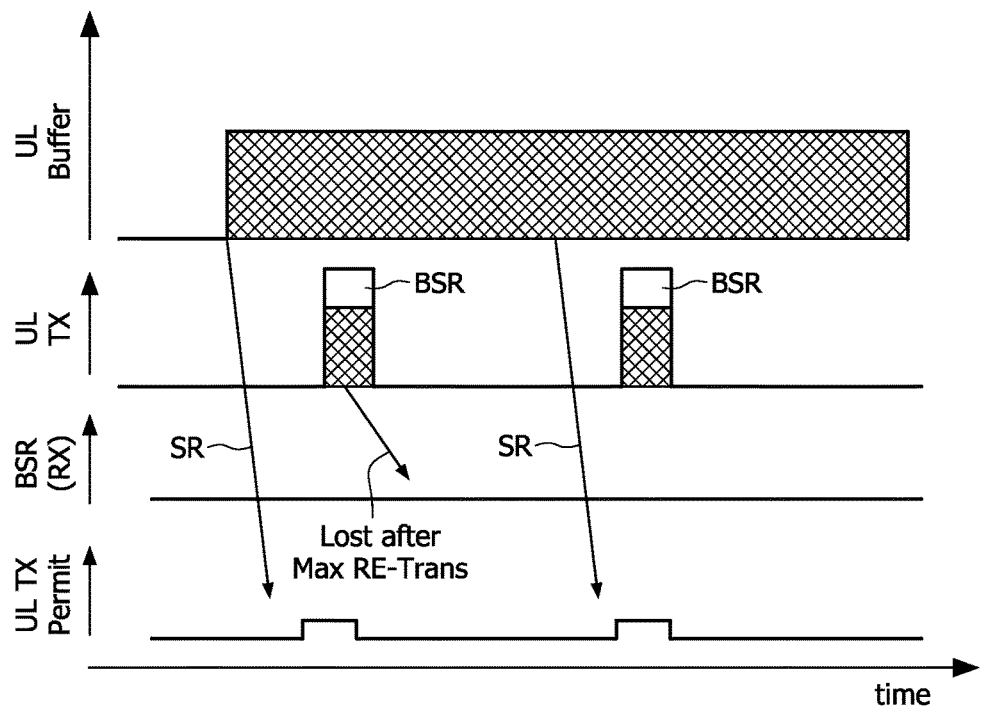
FIG. 3 is a time chart illustrated the exchange of messages in accordance with a method in accordance with an embodiment of the invention.

On FIG. 3, it is illustrated that if a BSR is lost, the whole process can be reinitiated, with the sending of an SR. In accordance with a variant of this embodiment, if some resource is allocated to the secondary station, it is possible to skip the first step (sending of an SR) and use directly this granted resource to send a BSR along with data.

This invention may be implemented in mobile communication systems where communication devices utilize centralized scheduling, such as UMTS and LTE.

Moreover, this invention could as well be implemented for hubs which route calls from multiple terminals to base stations. Such devices would appear like a secondary station from the point of view of the network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for operating a secondary station communicating in a network comprising at least one primary station communicating with at least one secondary station, the method comprising:

in the secondary station:
  sending through a transmitter and an antenna to a primary station a first buffer status report indicating a presence of data in a buffer of the secondary station, the buffer storing data for transmission to the primary station;
  retransmitting through the transmitter and antenna to the primary station, the first buffer status report when a positive acknowledgement from the primary station of receipt of the first buffer status report is not received through a receiver and the antenna from the primary station;
  monitoring by a processor a number of retransmissions to the primary station of the first buffer status report; and
  sending to the primary station through the transmitter and antenna a second buffer status report when:
    a maximum number of retransmissions of the buffer status report has been reached without receiving a positive acknowledgement of receipt of the first buffer status report from the primary station; and
    an indication of a resource grant by the primary station for an uplink transmission by the secondary station has not been received through the antenna and receiver within a time window since a last transmission of a first buffer status report.

2. A secondary station comprising:
  an antenna configured to send signals to and receive signals from a primary station;
  a buffer configured to store data to be transmitted to the primary station;
  a transmitter configured to transmit through the antenna to the primary station, a first buffer status report representative of an amount of data in the buffer;
  a receiver configured to receive from the primary station through the antenna:
    an acknowledgement of receipt of the first buffer status report; and
    an indication of a grant of a resource by the primary station for an uplink transmission by the secondary station, dependent on the first buffer status report or a second buffer status report; and
  the transmitter being configured to retransmit to the primary station, through the antenna, the first buffer status report when a positive acknowledgement of receipt of the first buffer status report, from the primary station is not received through the antenna and receiver; and
  a processing circuitry configured to monitor a number of retransmissions of the first buffer status report to the primary station and to configure the transmitter to send through the antenna, a second buffer status report to the primary station when:

a maximum number of retransmissions of the first buffer status report has been reached without receiving a positive acknowledgement of receipt of the first buffer status report from the primary station; and an indication of a resource grant by the primary station for an uplink transmission by the secondary station has not been received through the antenna and receiver within a time window since a last transmission of the first buffer status report.

3. The secondary station of claim 2, wherein when no indication of a grant of resources available for uplink transmission has been received, the second buffer status report is a scheduling request which indicates the presence of data in the buffer to be transmitted to the primary station.

4. The secondary station of claim 3, wherein the transmitter is configured to send the scheduling request at a time in which the acknowledgement from the primary station was expected but not received.

5. The secondary station of claim 2, wherein if the secondary station receives from the primary station an indication of a resource grant of an allocated uplink transmission resource, a buffer status report is transmitted on the allocated resource.

6. The secondary station of claim 2, wherein the second buffer status report is of a same type as the first buffer status report.

7. The secondary station of claim 2, wherein the second buffer status report is an update of the first buffer status report.

8. The secondary station of claim 2, wherein the second buffer status report is identical to the first buffer status report.

9. The secondary station of claim 2, wherein the transmitter is configured to resend to the primary station the second buffer status report when a positive acknowledgement of receipt of the second buffer status report is not received from the primary station.

10. The secondary station of claim 2, wherein the primary station is a base station and the secondary station is a mobile station, the secondary station is configured to receive control signals from the primary station through a downlink channel and the secondary station is configured to transmit data signals to the primary station through an uplink channel, wherein the data stored in the buffer and transmitted between the primary and secondary station comprises data packets, the resources comprising time and frequency schedules and the resource grant indications comprise one or more indications of time schedules, frequency schedules, data rate, or transmission power; for uplink transmission to the primary station.

11. The secondary station of claim 2, wherein the time window begins at the time of the last transmission of the previous not-positively acknowledged buffer status report, or wherein the time window begins at a time that a positive acknowledgement was expected but not received.

12. The secondary station of claim 2, wherein:
the buffer of the secondary station is a transmission buffer configured for storing packets of data to be transmitted to the primary station;
the first buffer status report is transmitted only when data arrives in the secondary station transmission buffer and the data belongs to a logical uplink channel with higher priority than any other logical uplink channels for which data already existed in the secondary station transmission buffer; and the first buffer status report being one of:
a scheduling request;
a buffer status; or
a periodic first buffer status report.

13. A system for communication comprising at least one primary station communicating with at least one secondary station, the system comprising:
a secondary station comprising:
a first antenna configured to send signals to and receive signals from a primary station;
a buffer configured to store data to be transmitted to a primary station;
a first transmitter configured to transmit through the first antenna to the primary station, a first buffer status report indicating a presence of data in the buffer;
a first receiver configured to receive through the first antenna from the primary station: positive acknowledgements of receipt of first buffer status reports, and indications of resource grants by the primary station for an uplink transmission by the secondary station, dependent on the first buffer status report or a second buffer status report;
the first transmitter being configured to retransmit, through the first antenna, to the primary station, the first buffer status report when an acknowledgement of the receipt of the first buffer status report from the primary station is not received through the first receiver and the first antenna from the primary station;
a first processor circuit configured to determine a number of retransmissions to the primary station of the first buffer status report; and
the first transmitter being configured to transmit through the first antenna a second buffer status report to the primary station when both:
a maximum number of retransmissions of the first buffer status report has been reached without receiving a positive acknowledgement of receipt of the first buffer status report from the primary station; and
an indication of a resource grant by the primary station for an uplink transmission by the secondary station has not been received through the first antenna and first receiver within a time window since a last retransmission of the first buffer status report; and
the primary station comprising:
a second antenna configured to send signals to and receiving signals from the secondary station;
a second receiver configured to receive through the second antenna from the secondary station:
a transmission of a first buffer status report indicating a presence of data in a buffer of the secondary station, the buffer storing data to be transmitted to the primary station; and
retransmissions of the first buffer status report when the secondary system does not receive a positive acknowledgement of receipt of the first buffer status report transmission from the primary station; and
a signaling of a second buffer status report when both:
a maximum number of retransmissions of the first buffer status report is reached without receiving a positive acknowledgement of receipt of the first buffer status report from the primary station; and
a resource grant is not received within a time window since a last transmission of a first buffer status report;
a second processor circuit configured to grant resources for a transmission by the secondary station, including resource grants depending on the receipt from the secondary station through the second antenna and the second receiver, of first buffer status reports or second buffer status reports; and
a second transmitter configured to transmit through the second antenna to the secondary station:
positive acknowledgments of the receipt of the buffer status reports; and
indications of the resource grants by the primary station for transmissions by the secondary station, including the resource grants dependent on the first buffer status report or on the second buffer status report.

14. A primary station comprising:
an antenna configured to send signals to and receive signals from a secondary station;
a receiver configured to receive from the secondary station through the antenna:
a transmission of a first buffer status report indicating a presence of data in a buffer of the secondary station, the buffer storing data to be transmitted to the primary station; and
retransmissions of the first buffer status report when the secondary station does not receive an acknowledgement of receipt of the first buffer status report transmission, from the primary station; and
a signaling of a second buffer status report when both:
a maximum number of retransmissions of the first buffer status reports is reached without receiving a positive acknowledgement of receipt of the first buffer status report from the primary station; and
a resource grant by the primary station for an uplink transmission of the secondary station is not received within a time window since a last transmission of a first buffer status report;
a processor circuit configured to grant resources for transmissions by the secondary station including resources depending on the receipt from the second station through the antenna and receiver of first buffer status reports or second buffer status reports; and
a transmitter configured to transmit through the antenna to the secondary station:
positive acknowledgments of the receipt of the first buffer status reports; and
indications of the resource grants by the primary station for a transmission by the secondary station, including the resource grants dependent on the first buffer status report or on the second buffer status report.

15. The primary station of claim 14, wherein the receiver is configured to receive from the secondary station, a re-signaling of the second buffer status report when a positive acknowledgement of receipt of the second buffer status report is not received by the secondary station.

16. The primary station of claim 14, wherein when the primary station has not transmitted an indication of a grant of resources for uplink transmission, the second buffer status report received from the secondary station is a scheduling request which indicates that there is data in the buffer to be transmitted to the primary station.

17. The primary station of claim 16, wherein when the scheduling request received from the secondary station is at a time at which the acknowledgement of receipt of a previous first buffer status report from the primary station was expected, the scheduling request is an indication that the secondary station did not receive the acknowledgement.

18. The primary station of claim 16, wherein if the secondary station receives from the primary station an indication of a resource grant of an allocated uplink transmission resource, the second buffer status report is a regular first buffer status report transmitted in the allocated resource.

19. The primary station of claim 14, wherein the second buffer status report is of a same type as the first buffer status report.

20. The primary station of claim 14, wherein the second buffer status report is an update of the first buffer status report.

21. The primary station of claim 14, wherein the second buffer status report is identical to the first buffer status report.

22. The primary station of claim 14, wherein the primary station is a base station and the secondary station is a mobile station, the primary station is configured to transmit control signals to the secondary station through a downlink channel and the primary station is configured to receive data signals from the secondary station through an uplink channel, the data stored in the buffer and transmitted between the primary and secondary station comprises data packets, the resources comprising time and frequency schedules and the resource grant indications comprise one or more indications of time schedules, frequency schedules, data rate, or transmission power; for uplink reception from the secondary station.

23. The primary station of claim 14, wherein the time window begins at the time of the last transmission of the previous not-positively acknowledged first buffer status report, or wherein the time window begins at a time that a positive acknowledgement was expected but not received.

24. The primary station of claim 14, wherein:
the buffer of the secondary station is a transmission buffer configured for storing packets of data to be transmitted to the primary station;
the first buffer status report is transmitted only when data arrives in the secondary station transmission buffer and the data belongs to a logical uplink channel with higher priority than any other logical uplink channels for which data already existed in the secondary station transmission buffer; and
the first buffer status report being one of:
a scheduling request;
a buffer status report; or
a periodic first buffer status report.

25. A method of operating a primary station for communicating in a network, with at least a secondary station, the method comprising:
in a primary station:
receiving from a secondary station through an antenna and a receiver:
transmissions of first buffer status reports indicating a presence of data in a buffer of the secondary station, the buffer storing data to be transmitted to the primary station;
retransmissions of the first buffer status reports when the secondary station does not receive a positive acknowledgement of receipt of the first buffer status report transmission, from the primary station; and a signaling of second buffer status reports when:
  a maximum number of retransmissions of the first buffer status reports is reached by the secondary station without receiving a positive acknowledgement of receipt for the first buffer status report from the primary station, and
  an indication of a resource grant by the primary station, for an uplink transmission by the secondary station is not received by the secondary station within a time window since a last transmission of a first buffer status report by the secondary station;
granting resources by a processor circuit, for a transmission by the secondary station, including resources depending on the receipt from the secondary station through the second antenna and the second receiver, of first buffer status reports or second buffer status reports; and
transmitting by a transmitter through the antenna, to the secondary station:
  positive acknowledgments of the receipt of the buffer status reports and second buffer status reports; and
  indications of the resource grants for a transmission by the secondary station, including the resource grants dependent on the buffer status reports or on the second buffer status reports.

26. A non-transitory computer readable storage medium having stored thereon instructions that when executed cause processing circuitry in a secondary station to:
send through a transmitter and an antenna to a primary station a buffer status report indicating a presence of data in a buffer of the secondary station, the buffer storing data to be transmitted to the primary station;
retransmit through the transmitter and antenna to the primary station, the first buffer status report when positive acknowledgement from the primary station of receipt of the first buffer status report is not received through the antenna and a receiver, from the primary station;
monitor by a processor a number of retransmissions to the primary station of the first buffer status report; and
send to the primary station through the transmitter and antenna a second buffer status report when:
  a maximum number of retransmissions of the first buffer status report has been reached without receiving a positive acknowledgement of receipt of the first buffer status report from the primary station, and
  an indication of a resource grant by the primary station for an uplink transmission by the secondary station has not been received through the antenna and a receiver within a time window since a last transmission of a first buffer status report.

27. A non-transitory computer readable storage medium having stored thereon instructions that when executed cause processing circuitry in a primary station to
receive from a secondary station through an antenna and a receiver:
  transmissions of buffer status reports indicating a presence of data in a buffer of the secondary station, the buffer storing data to be transmitted to the primary stat;
  retransmissions of the buffer status reports when the secondary system does not receive a positive acknowledgement of receipt of the first buffer status report transmission from the primary station; and
  a signaling of a second buffer status report when both:
    a maximum number of retransmissions of the first buffer status report is reached in the secondary station without receiving a positive acknowledgement of receipt of the first buffer status report from the primary station, and
    an indication of a resource grant by the primary station for an uplink transmission by the secondary station is not received by the secondary station within a time window since a last transmission of a first buffer status report by the secondary station;
grant resources by a processor of the primary station, for a transmission by the secondary station including resources depending on the receipt from the secondary station through the antenna and the receiver, of first buffer status reports or second buffer status reports; and
transmit by a transmitter through the antenna, to the secondary station:
  positive acknowledgments of the receipt of the first buffer status report and second buffer status report, when received by the primary station; and
  indications of the resource grants for transmissions by the secondary station, including the resource grants dependent on the first buffer status report or on the second buffer status report.

* * * * *